United States Patent [19]

Milsch et al.

[11] Patent Number: 4,648,279

[45] Date of Patent: Mar. 10, 1987

[54] METHOD OF AND DEVICE FOR MEASURING FLOW RATE BY ELECTROMAGNETIC INDUCTION

[75] Inventors: Ulrich Milsch, Bruchsal; Wolf-Dieter Pohlig, Siedelsbrunn, both of Fed. Rep. of Germany

[73] Assignee: Bopp & Reuther GmbH, Mannheim, Fed. Rep. of Germany

[21] Appl. No.: 748,153

[22] Filed: Jun. 24, 1985

[30] Foreign Application Priority Data

Jun. 22, 1984 [DE] Fed. Rep. of Germany ....... 3423076

[51] Int. Cl.$^4$ .............................................. G01F 1/60
[52] U.S. Cl. ................................................. 73/861.17
[58] Field of Search .......................... 73/861.16, 861.17

[56] References Cited

U.S. PATENT DOCUMENTS 3,316,762  5/1967  Westersten ....................... 73/861.17

*Primary Examiner*—Herbert Goldstein

*Attorney, Agent, or Firm*—Michael J. Striker

[57] ABSTRACT

Flow rate of an electrically conductive medium flowing through an electrically insulating pipe section is measured as a function of electrical voltages induced in the medium by electromagnetic fields generated by an exciter coil energized by a pulsating direct current. To eliminate noise signal components the repetition rate of the pulsating direct current applied to the exciter coil is set as an even integer multiple of a frequency of alternating current interference voltage component and the detection of measuring signals occurs in adjustable pick-up intervals of equal length so that a group of four or an integer multiple of four is detected during each period pertaining to the frequency of the interference voltage. Then every second detected measuring voltage is reversed in polarity and thereafter the measuring voltages in each group are integrated whereby the noise components are neutralized and a sum of pure useful voltage components is obtained.

11 Claims, 5 Drawing Figures

METHOD OF AND DEVICE FOR MEASURING FLOW RATE BY ELECTROMAGNETIC INDUCTION

BACKGROUND OF THE INVENTION

The present invention relates in general flow meters and in particular to a method of and a device for a magnetically inductive measurement of rate of flow of an electrically conductive medium flowing through an electrically insulating pipe section. The medium is exposed to a periodically pulsating electromagnetic field generated by an exciter coil energized by pulsating direct current. The induced useful voltage component which is proportional to the speed of flow, together with interference voltage components are detected during each pulse of the excitation current over a certain scanning period by two electrodes arranged on the insulating pipe section. In a convertor the detected voltages are integrated and the integrated values are mutually compared to eliminate interference alternating current and direct current voltage components.

In the prior art method of such an electromagnetically inductive flow rate measurement the unavoidable alternating current voltage components which usually occur at main frequency of 50 or 60 hertz, are integrated to zero during each half period of the supply current because the constant detection or integration time interval of respective measuring voltages is selected to correspond to the period of the interfering alternating voltage components or to an integral multiple thereof. During the integration time interval which matches the duration of a period of the alternating current interference voltage, the positive and negative half waves of the interference voltage cancel each other and consequently the average value of the interference voltage components which is superposed to the useful voltage components is zero.

After the elimination of the alternating current interference voltage components $U_s$ the integration values resulting from the detection of the measuring voltage U during the positive and negative half waves of the supply current, still contain a direct current interference voltage components $U_g$. In a known method of this kind, the direct current interference voltage components is neutralized in a second step of the method in which the difference between the positive and negative integration values is made resulting in a pure useful voltage $U_n$.

This known measuring method using pulsating direct current field has the disadvantage that rapid changes in the flow rate or pulsating flows cannot be correctly determined and consequently considerable measuring errors may occur. Since in the case of an interference voltage of a frequency of 50 hertz and two detections of the measuring voltage per a period of the supply voltage the detection for a complete interference voltage period requires 40 milliseconds (80 milliseconds for two such periods) and additional time is lost for the built-up of the electromagnetic field during switching on or switching over of the excitation current, prior art flow rate measurements based on magnetic induction operate in practice with electromagnetic fields excited at freuqencies from 8⅓ hertz to 3⅛ hertz. The time spacing between two delivered measured values of the through-flow amount in this case between 120 to 320 milliseconds and that time between two detections thus increases to 60 up to 160 milliseconds. Sudden drops or rises in the flow rate or flow speed of the measured medium may frequently occur in substantially shorter time intervals and accordingly the number of detections per second, the detection rate in such known measuring methods using switched-on field is too small for achieving an accurate measurement.

Also in the case of momentary flow rate measurements occuring for example in dosing, the measuring error increases proportionally with decreasing dosing or metering interval. For instance, the metering or dosing times in charging beverages, liquid medicines or liquid food stuffs into containers takes presently at least in part below a second and consequently without sufficient number of measuring values per dosing cycle no accurate metering is possible.

Moreover, in prior art magnetically inductive flow rate metering methods using closed or switched on field, the starting period of the excitation current and hence the power consumption of the apparatus is high, requiring considerable amounts of electric energy for the excitation of the coil and for the buildup of the magnetic field.

SUMMARY OF THE INVENTION

It is therefore a general object of the present invention to overcome the disadvantages of prior art methods and devices of this kind.

In particular it is an object of this invention to provide an improved flow rate metering method operating with electromagnetic induction in which both the alternating current and the direct current interference voltage components superposed to effective measuring voltage components are eliminated in a very simple way whereby very fast changes of the flow rate can be detected.

Another object of this invention is to save electric energy needed for the creation of the electromagnetic field.

In keeping with these objects and others which will become apparent hereafter, one feature of the invention resides, in an electromagnetically conductive flow rate metering method, in the steps of exposing the electrically conductive medium flowing through the insulating pipe section to electromagnetic field generated by an exciter coil energized by a pulsating direct current, detecting during preset pick-up intervals of constant length measuring voltages induced in the medium by said electromagnetic field, said measuring voltages including a useful component proportional to the flow rate of the medium, and alternating current and direct current interference components, integrating the measuring voltages, the repetition rate of the pulsating direct current being set to correspond to an even integer multiple of the frequency of the alternating interference voltage components whereby groups of four measuring voltages or integer multiples of the groups are detected and integrated during respective periods of the interference voltage components, reversing the polarity of every second measuring voltage or changing the sign of every second integrated value, and summing the integrated values during each period of the interference voltage components to obtain pure useful voltages components free of alternating current and direct current interference voltage components.

In a modification of the method of this invention, a group of four measuring voltages or an integer multiple of this group are detected during a summing period which corresponds to a multiple of the period of the alternating current interference voltage components, then the detected measuring voltages whose duration corresponds to arbitrary time intervals of constant length, are integrated, then the polarity of every second measuring voltage is reversed or the sign of every second integrated value of these voltages is changed, and thereafter the integrated values in each summing period are summed up to obtain pure useful voltage component free of alternating current or direct current interference voltage components.

In the first version of the method of this invention, by doubling or multiplying the excitation frequency and hence the rate of useful voltage which corresponds to the excitation frequency, with respect to the frequency of the interference voltage, the number of detections or readings of the flow rate value per a time unit is also multiplied and consequently fast variations in the rate of flow can be reliably detected. The flow rate variation to be determined can be the faster the higher is the detection rate, that means the shorter time interval is selected between two detections. The importance of this multiplication of the detection rate will become apparent when compared with prior art methods operating with switched-on direct current magnetic field with a detection rate between $16\frac{2}{3}$ to $6\frac{1}{4}$ detections per second. In the method of this invention, at an interference voltage frequency of 50 hertz and with only a single excitation frequency doubling to 100 hertz and hence a doubled number of detections per an excitation period there results 200 detections per second and in the case of monitoring the frequency 400 detections per second are obtained. The time spacing between the detections in these examples amounts to only 5 milliseconds or to $2\frac{1}{2}$ milliseconds and consequently sudden changes in the flow rate can be reliably determined. In the case of dosing or metering of liquids a sufficiently large number of measuring signals is available for each dosing cycle.

Since in the method of this invention the detection of the measuring value is multiplied within a period of the interference voltage, the interference voltage can no longer be eliminated in the same manner as in the prior art methods. Accordingly, according to another feature of the method of this invention the neutralization of the interference voltage components contained in the measuring voltage occurs in a different way. According to this invention, the time interval of the detection has a constant length which is selectable independently from the length of the period of the interference voltage and the elimination of the interference voltage is carried out in a surprisingly simple way as follows: It has been found that a quadruple, quadruple twin or a corresponding multiple for detections of the measuring voltage per each interference voltage period and at a constant time spacing between the detections, the integrated values of interference voltage obtained during the second half period of the interference voltage are inverse values of interference voltages integrated during the first half period of the interference signal. Accordingly, all integrated values of the interference voltage components can be neutralized during a period of the interference signal by their summation. Since in the case of a simple adding of integrated values, the correspondingly inverted useful voltage components would also cancel each other, in a further step in the method of this invention the polarity of every second measuring voltage is reversed or every second integrated value is provided with an opposite sign. As a consequence, during addition of the integrated values the positive and the inverted direct current interference voltage components are neutralized whereas the useful voltage components due to the alternating reversal of sign are summed up into a corresponding even integer multiple. It has been recognized that the change of sign of every second integration value has no detrimental effect on the neutralization of the alternating current interference voltage components inasmuch as in the case of a quadruple, quadruple twin or corresponding multiple detection of the measuring voltage during each period of the interference voltage the change of sign of the read-out interference voltage value occuring during the first half period of the interference signal is repeated in the second half period for the oppositely directed equal value of the interference voltage. Consequently, there result opposite alternating current interference voltage components of the same magnitude which cancel one another during the addition of the integrated values. In this manner during the summing or addition both the direct current interference voltage components as well as alternating current voltage components are neutralized during a single step and only pure useful voltage components remain.

Since the detection interval is set independently from the length of the period of the interference voltage, it can be made very short so that the excitation current is switched on for a corresponding short time interval. In this manner, the consumption of electrical energy needed for the excitation of the electromagnetic field is substantially reduced.

If it is desired to still further increase saving of electrical energy in exchange for a somewhat lower detection rate, a second version of the method of this invention in which the measuring voltages are periodically detected in groups of four or in an integer multiple of four during an adding period corresponding to a multiple of the interference voltage period. In contrast to the first version of this invention, the integration values are not added in a single interference voltage period but are summed up in a summing period corresponding to several interference voltage periods. Even in this modification the alternating interference voltage components are neutralized during the summing up of integrated values during a summing period and also the direct current interference voltage components due to the alternating reversal of the sign are eliminated. Due to the detection in a summing period consisting of several interference voltage periods less detection intervals per second are needed and consequently the method operates with smaller switch-on times for the excitation current.

If only one frequency of the interference voltage is present in the second version of this invention, it is of advantage to make the summing period an odd integer multiple, preferably a triple length of the interference voltage period. When during the latter summing period only four detections are read, both the alternating current and the direct interference voltage components are reliably neutralized by the addition of the integrated values. At a correspondingly increased detection rate of 8, 12 or more detections per summing period a correspondingly higher resolution of the measuring values is obtained. The oppositely directed equal values of interference voltage occur in this case after an odd integer number of half waves of the interference voltage, that means in the case of summing period corresponding to three periods of interference voltage, the opposed interference voltages occur after three half waves and in an addition or summing period corresponding to five interference voltage periods, after five interference voltage half waves.

In the second version of the method of this invention the elimination of the alternating current and direct current interference voltage components can be obtained even if several alternating current interference voltage components of different frequencies are present. In this case the summing period is selected of such a length as to correspond to the sum of all periods of the interference voltage or to a multiple thereof and the measuring voltages are periodically detected four times or an integer multiple of four times during the longest component period of the interference voltage.

For example if an alternating current interference voltage with a main frequency of 50 hertz and a further alternating current interference voltage with a railroad frequency of $16\frac{2}{3}$ hertz are present, and assuming that still another alternating current interference voltage at a frequency of 25 hertz is added, then the combined interference signal includes three different periods of 20 milliseconds, 60 milliseconds, and 40 milliseconds. In this case the summing period would amount to a common denominator, namely to 120 milliseconds. During this summing period, the measuring voltage is detected at least eight times inasmuch as the longest period of interference voltage (60 milliseconds) is contained two times in the summing period and the detected measuring voltages are to be read at least four times. Under these assumptions the picked-up alternating current interference voltage components having three different frequencies are neutralized in their entirety simultaneously during the addition of individual integrated values. Due to the alternating changes of the sign of the measuring voltage or of the integrated values the direct current interference voltage components are also eliminated at the same time.

Since the periodically pulsating direct current of the exciter coil is generated by changing the polarity of the current and the switched-on time of the excitation current is substantially shorter than its half period, the oppositely directed measuring values of the same magnitude can be picked up in short detection intervals and accordingly electrical energy needed for the excitation of the electromagnetic field can be substantially shortened. In order to further reduce the switch-on times for the excitation current, the time interval for detection or integration is made shorter than the switch-on time of excitation current and the detection takes place in an end range of the excitation interval after the build-up of the electromagnetic field.

In the device of this invention, there is provided a polarity reversing circuit portion connected to a subsequent integrating, storing and summing circuit portion leading to an output stage.

The polarity reversing subcircuit includes preferably a operational amplifier whose inverting input is connected through a resistor to an electrode for picking up the measuring voltage induced in the medium, and another resistor bridges the output of the amplifier with the inverting input; the non-inverting input of the amplifier is connected by a switch either to one pick-up electrode or to the opposite pick-up electrode whereby the reversal of the positions of the switch is controlled by a pulse generator. In this manner the measuring voltage before its integration is applied to the integrating subcircuit at first in its original polarity and in the next detection interval with an inverted polarity. In the integrating subcircuit the detected measuring voltage is integrated and stored whereas in the subsequent detecting phase the new value is added to the stored value and the sum is again stored so that during a summing period all detected values are integrated and stored.

The novel features which are considered as characteristic for this invention are set forth in particular in the appended claims. The invention itself both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
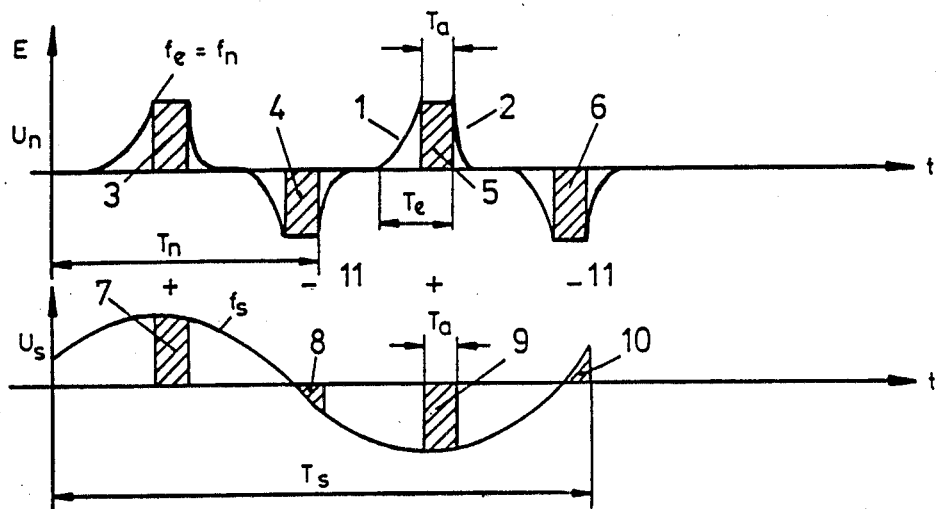
FIG. 1 is a time diagram showing the relation between pulsating excitation current, the detection intervals and the interference voltage period in a first version of the flow rate metering method of this invention.

The plot diagram in FIG. 1 shows in the upper system of coordinates the time course of pulsating excitation current E for generating electromagnetic field in the measured medium, and in the lower coordinate system the time course of an alternating current interference voltage component $U_s$ superposed to the useful voltage component $U_n$ induced in the measuring medium. According to a first version of the method of this invention, frequency $F_e$ of the excitation current corresponds to a doubled frequency of the interference voltage ($2F_s$). The detected measuring voltage U consists of a useful voltage component $U_n$ which is proportional to the magnitude of the excitation current E, of an alternating current voltage component $U_s$ and of a direct current interference voltage component $U_g$. The measuring voltage U is periodically detected for a selected detection interval $T_a$ of constant length and is integrated four times during the interference voltage period $T_s$. The detection time interval $T_a$ is selected independently from the duration of the period $T_s$ of the interference voltage and can be made very short so that the switch-on period $T_e$ of each excitation current pulse can be reduced. The shape of the time behavior of each switched-on direct current pulse or electromagnetical field is affected by the interia of the electromagnetic field after turning on the excitation current E as indicated by the building-up section 1 and the wake section 2 of the characteristic curve of the excitation current corresponding to the measuring voltage U.

Since during each period $T_s$ of the interference voltage component two periods $T_n$ of the useful voltage component $U_n$ will occur, and the detection of the measuring voltage U takes place during respective half periods of the useful voltage component, then in accordance with this example there are detected four voltage pulses 3, 4, 5 and 6 during each period $T_s$ of the interference voltage. The detection interval $T_a$ is contained within the switched-on interval of the excitation current E and corresponds to the switched-on interval $T_e$ with the duration of the built-up interval 1. Voltage values 3 through 6 detected over detection intervals $T_a$ as indicated by hatching represent the integration values for the useful voltage components which upon changing polarity of each second measuring voltage 4 and 6 are summed up into an integration value.

As indicated in the lower time plot in FIG. 1, during the interference voltage period $T_s$ the four measuring voltages $U_n$ detected during this period contain different alternating current interference voltage components 7, 8, 9 and 10 whose values indicated by etching are integrated into an AC interference voltage component $U_s$. The four interference voltage sections 7 through 10 detected during the detection intervals $T_a$ are mutually neutralized during their addition inasmuch as the positive integration value 7 in the first half wave is exactly of the same size as the corresponding negative integration value 9 in the second half wave; similarly the negative integration value 8 is exactly so large as the positive integration value 10. The cancellation of the interference voltage components is guaranteed due to the fact that the time spacing between the counteracting detecting value 7 and 9 or 8 and 10 corresponds exactly to a half period of the interference voltage, that means they are phase shifted by 180° and the opposite magnitudes 7, 9 and 8, 10 are situated at the same points of respective half waves.

In this case the reversal of signs 11 of every second integrated value is not detrimental to the elimination of the interference voltage component $U_s$ because the detected values 7 and 9 retain their sign unchanged and hence cancel each other whereas the oppositely directed values 8 and 10 merely change their direction and are still neutralized in the summing step. Similarly non-illustrated direct current interference voltage components $U_g$ are also eliminated due to the polarity reversal of every second pulse and are also eliminated in the subsequent summing step so that pure useful voltage $U_n$ proportional to the measured rate of flow, will remain.

Figure 2:
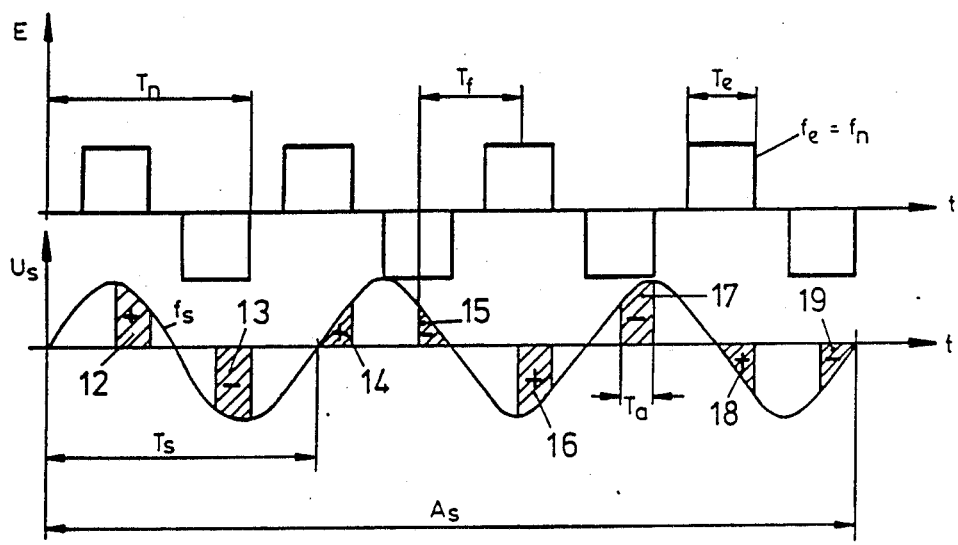
FIG. 2 is a time diagram showing the relation between the pulsating excitation current, the detection intervals and a summing period corresponding to three interference voltage periods and including eight detection intervals.

FIG. 2 shows a time plot of a modified version of the flow rate measuring method of this invention in which measuring voltage U is periodically detected eight times during summing or addition period $A_s$ corresponding to a combined length of three interference voltage periods $T_s$. The course of the pulsing excitation current E is illustrated in simplified form and with prolongated switch-on times $T_e$ to more clearly indicate the alternating current interference voltage components picked up during detection intervals. The useful voltage components $U_n$ detected during each time interval $T_{n/2}$ are omitted. The detection intervals coincide with the end range of the switched-on duration $T_e$ and the detected pulses of 12 through 19 of the detected alternating current interference voltage $U_s$ are indicated with the corresponding changes of sign. In contrast to the before described version of the method of this invention in this example the frequency $f_e$ of the excitation current E of the frequency $f_n$ of the useful voltage amounts only to 4/3 of the frequency $f_s$ of the interference voltage. Consequently time spacing $T_f$ between respective detection intervals is increased whereas the switched-on intervals $T_e$ of the excitation current E are shortened.

In spite of the fact that this version does no longer use pairs of detection intervals per a half period of the interference voltage, all integration values 12 through 19 are mutually cancelled during their addition. The interference voltage pulse 12 and the oppositely directed pulse 16 occurring after three half periods of the interference voltage are of equal shape and the same relation is between the pulses 13 and 17, 14 and 18, and 15 and 19. The mutual neutralization of the AC interference voltage components $U_s$ also in this case is unaffected by the reversal of every second sign inasmuch pulses 12 and 16 as well as 14 and 18 retain their original sign whereas the pulses 13, 17 and 15, 19 which undergo a sign reversal remain directed opposite each other. Due to the even number of detection intervals during the additive period $A_s$ and due to the sign reversal of every second detected pulse even in this case it is ensured that the direct current interference voltage components $U_g$ cancel each other during the adding step and pure useful voltage signals $U_n$ the result.

Figure 3:
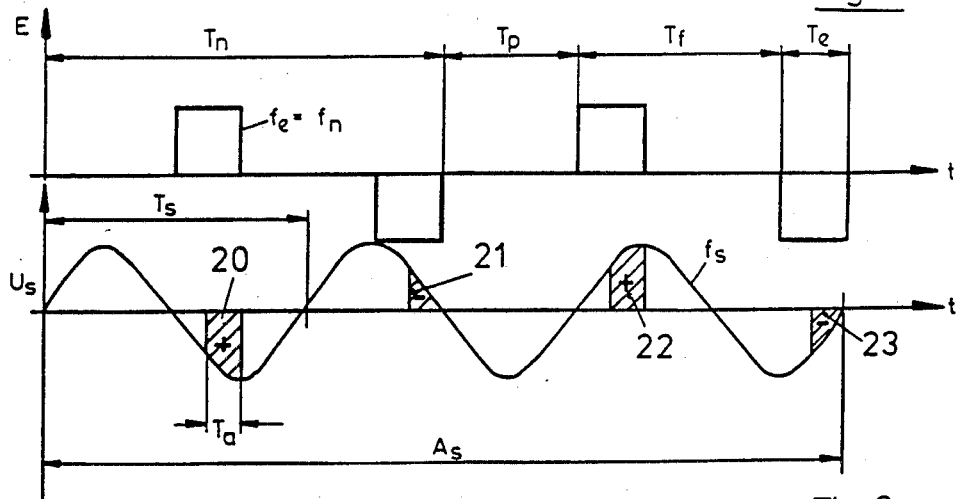
FIG. 3 is a modification of the diagram of FIG. 2 showing four detection intervals during a summing period.

In the time diagram according to FIG. 3 the measuring voltage U is detected only four times during a summing or additive period $A_s$ corresponding in length to three periods $T_s$ of the interference voltage. Accordingly, time spacing $T_s$ between individual detection intervals is considerably increased while the switch-on time $T_e$ and the separation time $T_p$ between the switch-on intervals remain the same as in the preceding example. The four detected AC interference voltage components 20 through 23 are again neutralized during the subsequent addition inasmuch the integrating value 20 after three half wave lengths of the interference voltage corresponds to the inverse value of the integration pulse 22. Similarly, the integration values 21 and 23 are spaced apart by three half wav lengths of the interference voltage and cancel each other. In spite of the sign reversal of the two integration values 21 and 23 the mutual neutralization of these values takes place. The frequency $f_n$ of useful voltage components in this example is smaller than the frequency $f_s$ of the interference voltage and amounts only to ⅔ of the latter.

Figure 4:
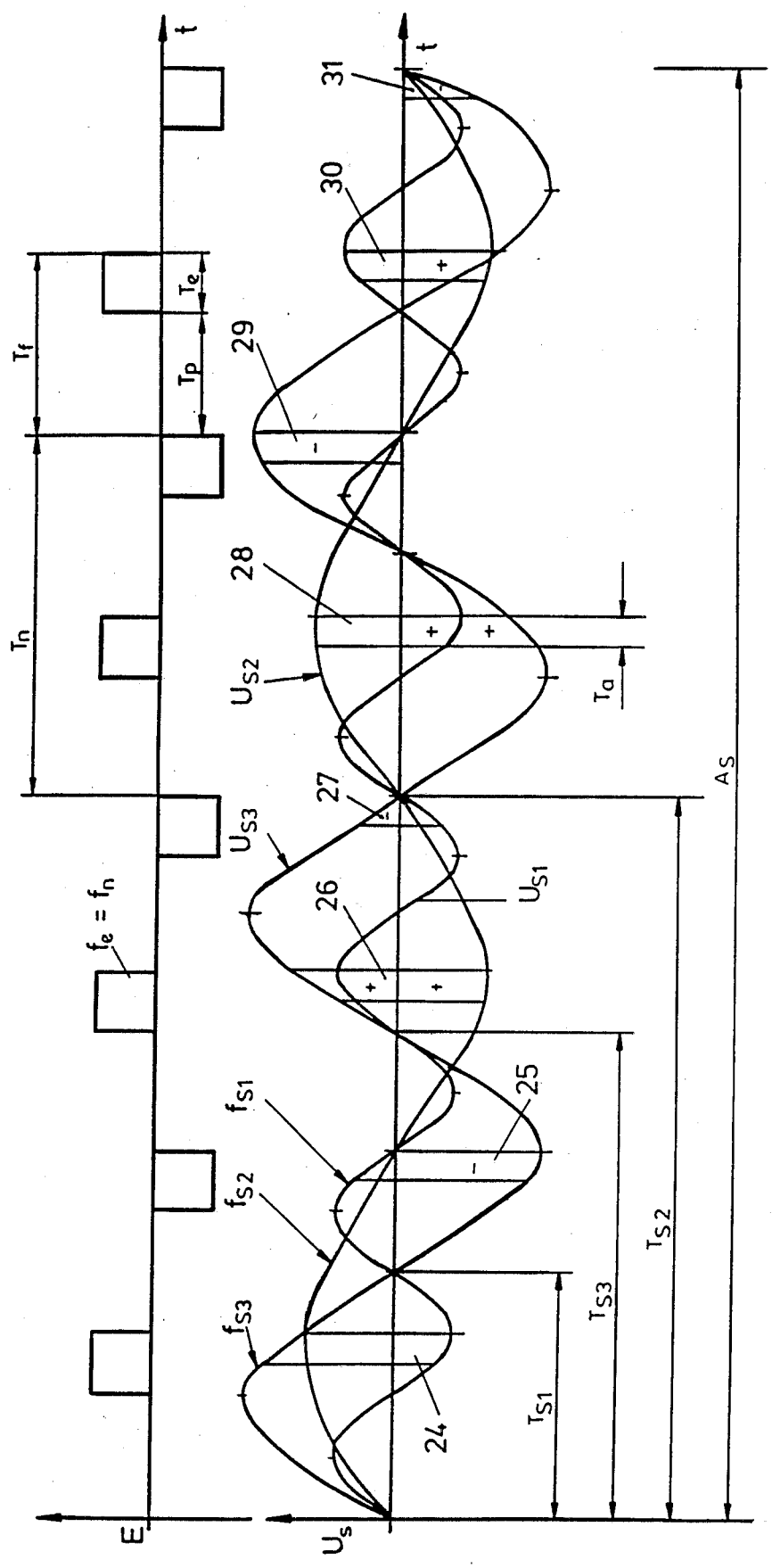
FIG. 4 is a time diagram showing the relation between pulsating excitation current, the detection periods and a summing period corresponding to combined periods of three alternating current interference voltage components of different frequencies.

The time diagrams of FIG. 4 illustrate the elimination of compound interference voltages consisting, in this example, of three interference voltage components $U_{s1}$, $U_{s2}$ and $U_{s3}$ of different frequencies $f_{s1}$ equals 50 hertz, $f_{s2}$ equals 16⅔ hertz and $f_{s3}$ equals 25 hertz. Accordingly, the periods of respective interference voltages $T_{s1}$ equals 20 milliseconds, $T_{s2}$ equals 60 milliseconds and $T_{s3}$ equals 40 milliseconds. The ratio of the three frequencies is 1:⅓:½ and their least common denominator is 6 so that the additive period $A_s$ corresponds to six periods $T_1$, amounting to 120 milliseconds. The period $T_{s2}$ is contained twice and the period $T_{s3}$ is contained three times in the additive period $A_s$. During the longest period $T_{s2}$ of the second interference voltage component the detection is performed four times so that during the single additive periods the interference voltages are detected eight times, namely in the time intervals 24 through 31.

If one considers the relations between individual interference voltages separately, it will be seen that for interference voltage $U_{s1}$ equal integration values of opposite polarity are present at time intervals 24, 26 and 25, 27 as well as 28, 30 and 29, 31 so that all these AC interference voltage components $U_{s1}$ will surely cancel.

In the case of the interference voltage $U_{s2}$ the oppositely directed detected pulses of equal magnitude occur at intervals 24, 26 and 25, 27 as well as at 28, 30 and 29, 31. The corresponding pairs of opposite pulses of the interference voltage $U_{s3}$ occur at time intervals 24, 28; 25, 29; 26, 30 and 27, 31. Therefore, all detected values of respective interference voltages are eliminated in the subsequent additive step and this voltage neutralization is effective for the entire compound interference voltage $U_s$ resulting from the superposition of individual interference voltage components.

Figure 5:
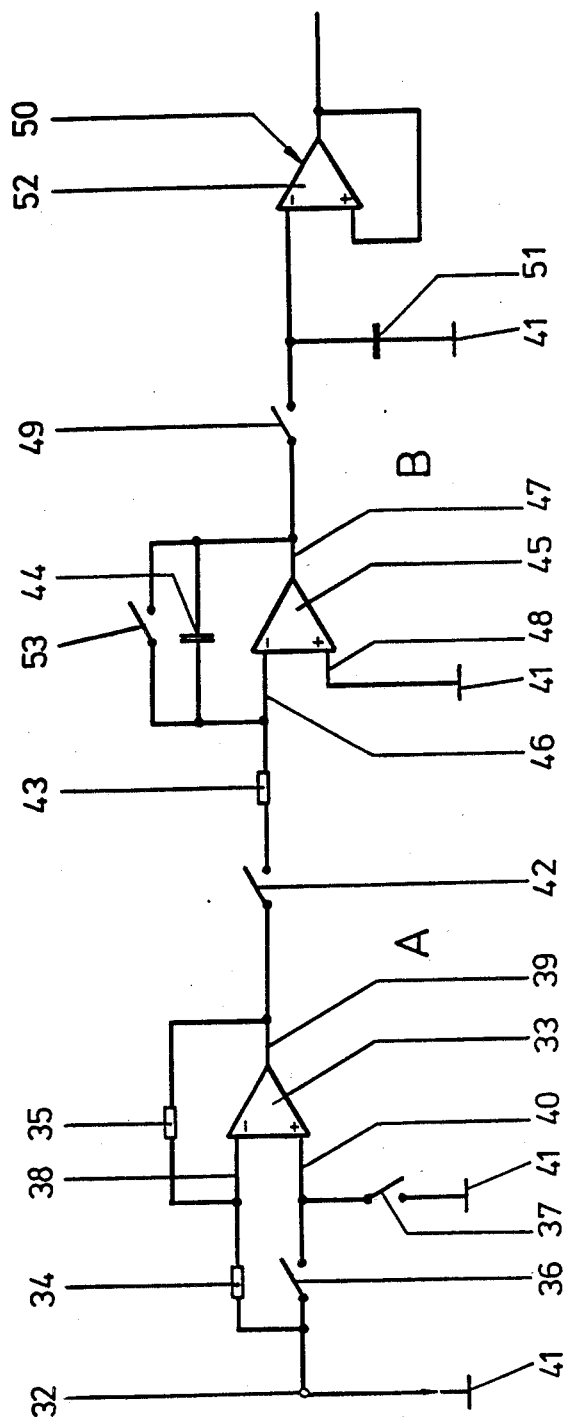
FIG. 5 is an embodiment of a circuit for carrying out the method of this invention.

The device of this invention, illustrated schematically in the electric circuit diagram in FIG. 5 is connected to a magnetic induction type flow rate meter and includes a polarity reversing part A, an integrating part B and an output part 50. An input terminal 32 of the circuit picks up amplified measuring voltage U consisting of superposed useful voltage component $U_n$, AC interference voltage component $U_s$ and DC interference voltage component $U_g$. The polarity reversing circuit part A includes an operational amplifier 33, two equal resistors 34 and 35 and switches 36 and 37. The inverting input 38 of the operational amplifier 33 is connected to the input terminal 32 through resistor 34 and through the resistor 35 of the same value to the output 39 of the amplifier. The non-inverting input 40 of the amplifier 33 is alternately connected by switch 36 to the input terminal 32 or through switch 37 to ground 41. Both switches 36 and 37 are activated by a non-illustrated pulse generator to change their positions after each detection interval. If the switch 36 is closed and the switch 37 open the input signal does not reverse its polarity and is amplified at the output 39 with the same sign. When the positions of switches 36 and 37 are changed by the pulse generator, that is if switch 37 is closed and switch 36 is open the polarity of the input signal is reversed and the measuring voltage U is amplified at the output 39 with an opposite sign.

The pulse generator controls also switch 42 to close the same for the duration of the detection interval. In other words, the detection interval is adjustable in accordance with the pulse rate of the controlling pulse generator. The integrating circuit pulse B consists of a resistor 43, an integrating capacitor 44 and an operational amplifier 45. The inverting input 46 of amplifier 45 is connected through resistor 43 and switch 42 to the output 39 of the polarity reversing circuit part A, and via an integrating capacitor 44 to the output 47 of the amplifier 45. The non-inverting input 48 of the amplifier 45 is connected to the potential of the ground 41. The integrating circuit part B integrates during each detection interval the measuring voltages delivered from the output 39 of the amplifier 33. The accumulated or integrated value remains stored in the capacitor 44 and the subsequent integrating value picked up during the next detection interval is added to the stored total or integrated value so that after the last detection interval within the interference voltage period or additive period the total integrated value is available at the output 47. The total integrated value is free of all AC of DC interference voltage components and corresponds to useful voltage signal which is proportional to the flow rate of the measured medium.

After each adding period a scanning switch controlled also by the controlling pulse generator is momentarily closed and applies the total integrated value from the output 47 to the input of an evaluation end stage 50 consisting of a capacitor 51 and an impedance converter 52. The output of the impedance converter 52 which can be also in the form of an operational amplifier is connected to non-illustrated circuit parts for further processing of the measured signal. The integrated measured value is stored in the capacitor 51 up to the end of the next detecting cycle. As soon as the scanning switch 49 is opened the controlling pulse generator momentarily closes the discharging switch 53 connected across the integrating capacitor 44 and discharges the same so as to completely extinguish the preceding sum of the measuring voltages and prepare the integrating capacitor for a next integrating cycle. This process is repeated in each adding or summing period.

It will be understood that each of the elements described above, or one or more together may also find a useful application in other types of circuits differing from the type described above.

While the invention has been illustrated and described as embodied in a specific example of the flow rate measuring device and method, it is not intended to be limited to the details shown since various modifications and structural changes may be made without departing in anyway from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of measuring flow rate of an electrically conductive medium flowing through an electrically insulating pipe section, comprising the steps of exposing the medium flowing through said pipe section to electromagnetic fields generated by an exciter coil energized by a pulsating direct current; detecting periodically during selected pick-up time intervals ($T_a$) of uniform length measuring voltages induced in the medium by said electromagnetic field, said measuring voltages including a useful voltage component proportional to the flow rate of the medium and alternating current and direct current interference voltage components; setting the repetition rate ($f_e$) of said pulsating direct current so as to correspond to a double or a higher even integer multiple of a frequency ($f_s$) of said alternating current interference voltage component whereby during each period ($T_s$) of the alternating current interference voltage a group of four measuring voltages or of an integer multiple of four having a frequency corresponding to the repetition rate of said pulsating direct current, are detected; reversing the polarity of every second measuring voltage; and integrating during each period ($T_s$) of the alternating current interference voltage component the measuring voltages in said group whereby the alternating current and direct current interference voltage components are neutralized and sum of pure useful voltage components is obtained.

2. A method of measuring flow rate of an electrically conductive medium flowing through an electrically insulating pipe section, comprising the steps of exposing the medium flowing through said pipe section to electromagnetic fields generated by an exciter coil energized by alternate pulses having opposite polarity; detecting periodically during adjustable time intervals ($T_a$) of uniform length voltages induced in the medium by said electromagnetic fields, said measuring voltages including a useful voltage component proportional to the flow rate of the medium and alternating current and direct current interference voltage components; reversing the polarity of every second measuring voltage; and integrating during a summing period ($A_s$) corresponding to a multiple of a period ($T_s$) of the alternating current interference voltage component, a group of four or an integer multiple of four measuring voltages at a frequency corresponding to an even integer multiple of a repetition rate of said alternating current pulses whereby the alternating current and direct current interference voltage components are neutralized and a sum of pure useful voltage components is obtained.

3. A method as defined in claim 2, wherein in the case of a simple alternating current interference voltage component of a single frequency ($f_s$) the summing period ($A_s$) corresponds to an odd integer multiple of the period ($T_s$) of the AC interference voltage component.

4. A method as defined in claim 3, wherein said summing period ($A_s$) corresponds in length to three AC interference voltage periods ($T_s$).

5. A method as defined in claim 2, wherein in the case of a compound AC interference voltage component including several different frequencies ($f_{s1}$, $f_{s2}$, $f_{s3}$) the length of the summing period ($A_s$) corresponds to the least common multiple of the length of periods ($T_{s1}$, $T_{s2}$, $T_{s3}$) of respective frequencies of said AC interference voltage component or to an integer multiple of said summing period; and detecting periodically during a period pertaining to a lowest frequency in said AC interference voltage component a group of four or an integer multiple of four measuring voltages.

6. A method as defined in claim 1, wherein the duration of said pulsating direct current ($T_e$) applied to said exciter coil is substantially shorter than the half period ($T_{n/2}$) of the induced measuring voltage.

7. A method as defined in claim 6, wherein said pick-up interval ($T_a$) is shorter than the duration of said pulsating direct current ($T_e$) whereby the detection occurs in the end range of each energizing direct current pulse.

8. A device for measuring flow rate of an electrically conductive medium flowing through an electrically insulating pipe, comprising means for exposing the medium flowing through said pipe section to electromagnetic fields generated by an exciter coil energized by alternate current pulses having opposite polarity, pick-up electrodes arranged in an insulating pipe section to pick up measuring voltage induced in the medium by said electromagnetic fields; a circuit connected via first control switching means to said electrodes to reverse polarity of every second pulse of the measuring voltage detected on said electrodes; an integrating circuit coupled via second control switching means to an output of said polarity reversing circuit; and a storing output circuit connected via a third control switching means to said integrating circuit.

9. A device as defined in claim 8, wherein said polarity reversing circuit includes an operational amplifier whose inverting input is connected via a resistor to a detecting electrode and via another resistor to the output of the amplifier, and whose non-inverting input is alternately connected via said first control switching means to said first mentioned detecting electrode and to ground.

10. A device as defined in claim 9, wherein said integrating circuit includes a second operational amplifier whose inverting input is connected via a resistor and said second control switching means to the output of the first mentioned operational amplifier; an integrating capacitor bridging the inverting input with the output of said second operational amplifier; a switch connected across said integrating capacitor; the non-inverting input of said second operational amplifier being connected to ground; said storing output stage including a third operational amplifier having its inverting input connected via said third control switching means to the output of said second operational amplifier; a storing capacitor connected between the inverting input of said third operational amplifier and ground; and the output of said third operational amplifier being connected to its non-inverting input.

11. A device for measuring flow rate of an electrically conductive medium flowing through an electrically insulating pipe, comprising means for exposing the medium flowing through a pipe section to electromagnetic fields generated by an exciter coil energized by a pulsating direct current; pick-up electrodes arranged in said insulating pipe section to pick up periodically during selected pick-up time intervals of uniform length measuring voltages induced in the medium by said electromagnetic fields, said measuring voltages including a useful voltage component proportional to the flow rate of the medium and alternating current and direct current interference voltage components; means for setting the repetition rate ($f_e$) of said pulsating direct current so as to correspond to a double or a higher even integer multiple of a frequency ($f_s$) of said alternating current interference voltage component; means for detecting during each period of the alternating current interference voltage component a group of four measuring voltages or of an integer multiple of four having a frequency corresponding to the repetition rate of said pulsating direct current; means connected to said electrodes to reverse polarity of every second pulse of the measuring voltage detected on said electrodes; an integrating circuit coupled via controlling switching means to an output of said polarity reversing means; and a storing output circuit connected via another controlling switching means to said integrating circuit.

* * * * *